(12) United States Patent
Lin

(10) Patent No.: US 8,512,624 B2
(45) Date of Patent: Aug. 20, 2013

(54) MANUFACTURING PROCESS FOR A BICYCLE HUB AND PRODUCT THEREOF

(76) Inventor: Shu-Wei Lin, Taichung (TW)

(*) Notice: Subject to any disclaimer, the term of this patent is extended or adjusted under 35 U.S.C. 154(b) by 600 days.

(21) Appl. No.: 12/652,703

(22) Filed: Jan. 5, 2010

(65) Prior Publication Data

US 2011/0163594 A1  Jul. 7, 2011

(51) Int. Cl.
*B29C 45/00* (2006.01)

(52) U.S. Cl.
USPC ............ 264/513; 264/516; 264/571; 264/257

(58) Field of Classification Search
USPC .................................. 264/513, 516, 571, 257
See application file for complete search history.

(56) References Cited

U.S. PATENT DOCUMENTS

| | | | | |
|---|---|---|---|---|
| 4,950,064 | A * | 8/1990 | Akin, Jr. .................... | 359/503 |
| 7,048,985 | B2 * | 5/2006 | Mack et al. ................. | 428/111 |
| 2002/0109398 | A1 * | 8/2002 | Meggiolan ................. | 301/110.5 |
| 2004/0145091 | A1 * | 7/2004 | Willig et al. ................ | 264/510 |
| 2004/0251736 | A1 * | 12/2004 | Mercat et al. .............. | 301/105.1 |

* cited by examiner

*Primary Examiner* — Joseph S Del Sole
*Assistant Examiner* — David N Brown, II

(57) ABSTRACT

A manufacturing process for a bicycle hub includes steps of preparing dry carbon fiber fabric, covering around inner tube, placing in upper and lower molds, injecting adhesive into the upper and lower molds, and forming by heating and pressurizing. Because the manufacturing process uses tubular dry carbon fiber fabric to form a hub shell, the manufacturing process is simple and the produced hub has few defects. Thus, the production rate and product stability are enhanced.

6 Claims, 3 Drawing Sheets

MANUFACTURING PROCESS FOR A BICYCLE HUB AND PRODUCT THEREOF

BACKGROUND OF THE INVENTION

1. Field of Invention

The present invention relates to a manufacturing process for bicycle parts, and more particularly to a manufacturing process for a bicycle hub and product thereof that are simple and can increase the production rate and product durability.

2. Description of the Related Art

Bicycle hubs are used on axles of bicycle wheels and generally include a hollow and cylindrical shell and other components such as bearings mounted in the shell. The shell has two radical flanges formed prominently and respectively on two ends. Each flange has multiple through holes for connecting to spokes of a bicycle wheel. The spokes connect to the hub and the rim of the bicycle. Appropriate tension is applied on the spokes to maintain the shape of the wheel.

Conventional hub shells are formed by machining aluminum alloys or steel materials. For the requirement of lightweight bicycles, some hub shells are made by carbon fiber material to reduce weight but still maintain strength. Conventional carbon fiber hub shells are first manufactured by overlaying and then rolling several carbon fiber sheets and then formed by bonding with resin and molding to acquire a required shell shape.

However, because above conventional manufacturing process uses the complicated procedures of overlaying and rolling several carbon fiber sheets, the production rate is slow. In addition, the procedures of overlaying, rolling and bonding may cause some defects such as bubbles and cracks in the product, thus the product has a low stability and must be improved by applying filling paste or clear coat at a back-end manufacturing procedure. Above problems all result in a high manufacturing cost.

To overcome the shortcomings, the present invention provides a manufacturing process for a bicycle hub and product thereof to mitigate or obviate the aforementioned problems.

SUMMARY OF THE INVENTION

The primary objective of the present invention is to provide a manufacturing process for a bicycle hub and product thereof that use tubular dry carbon fiber fabrics to form the hub and simplify the manufacturing process, so as to raise the production rate and product stability.

A manufacturing process for a bicycle hub in accordance with the present invention comprises steps of preparing dry carbon fiber fabric, covering around inner tube, placing in upper and lower molds, vacuumizing, injecting adhesive into upper and lower molds and forming by heating and pressurizing.

In the step of preparing dry carbon fiber fabric, at least one layer of tubular dry carbon fiber fabric is pre-woven and each one of the at least one layer of tubular dry carbon fiber fabric is formed by weaving and covering with at least one layer of carbon fiber.

In the step of covering around an inner tube, the at least one layer of tubular dry carbon fiber fabric is covered around a metal inner tube and at least one of the at least one layer of tubular dry carbon fiber fabric wraps multiple reinforcing elements respectively on two ends.

In the step of placing in upper and lower molds, the inner tube and the at least one layer of tubular dry carbon fiber fabric covered around the inner tube are placed in upper and lower molds.

In the step of vacuumizing, the inside of the upper and lower molds is vacuumized In the step of injecting adhesive into upper and lower molds, adhesive is injected into the upper and lower molds and the at least one layer of tubular dry carbon fiber fabric is fully permeated by and impregnated with adhesive.

In the step of forming by heating and pressurizing, the at least one layer of tubular dry carbon fiber fabric impregnated with adhesive is heated and pressurized to form at least one carbon fiber layer.

A bicycle hub produced by the manufacturing process in accordance with the present invention comprises at least one tubular carbon fiber layer, multiple reinforced elements, two bearing brackets, two bearings and a shaft.

Each one of the at least one tubular carbon fiber layer has a pre-woven tubular carbon fiber fabric and a cross-section of a closed curve and is seamless. The reinforced elements are mounted respectively in at least one of the at least one tubular carbon fiber layer on two ends. The bearing brackets are mounted respectively in the ends of the at least one tubular carbon fiber layer. The bearings are mounted respectively in the bearing brackets. The shaft is mounted through the bearings.

Other objectives, advantages and novel features of the invention will become more apparent from the following detailed description when taken in conjunction with the accompanying drawings.

DETAILED DESCRIPTION OF THE INVENTION

Figure 1:
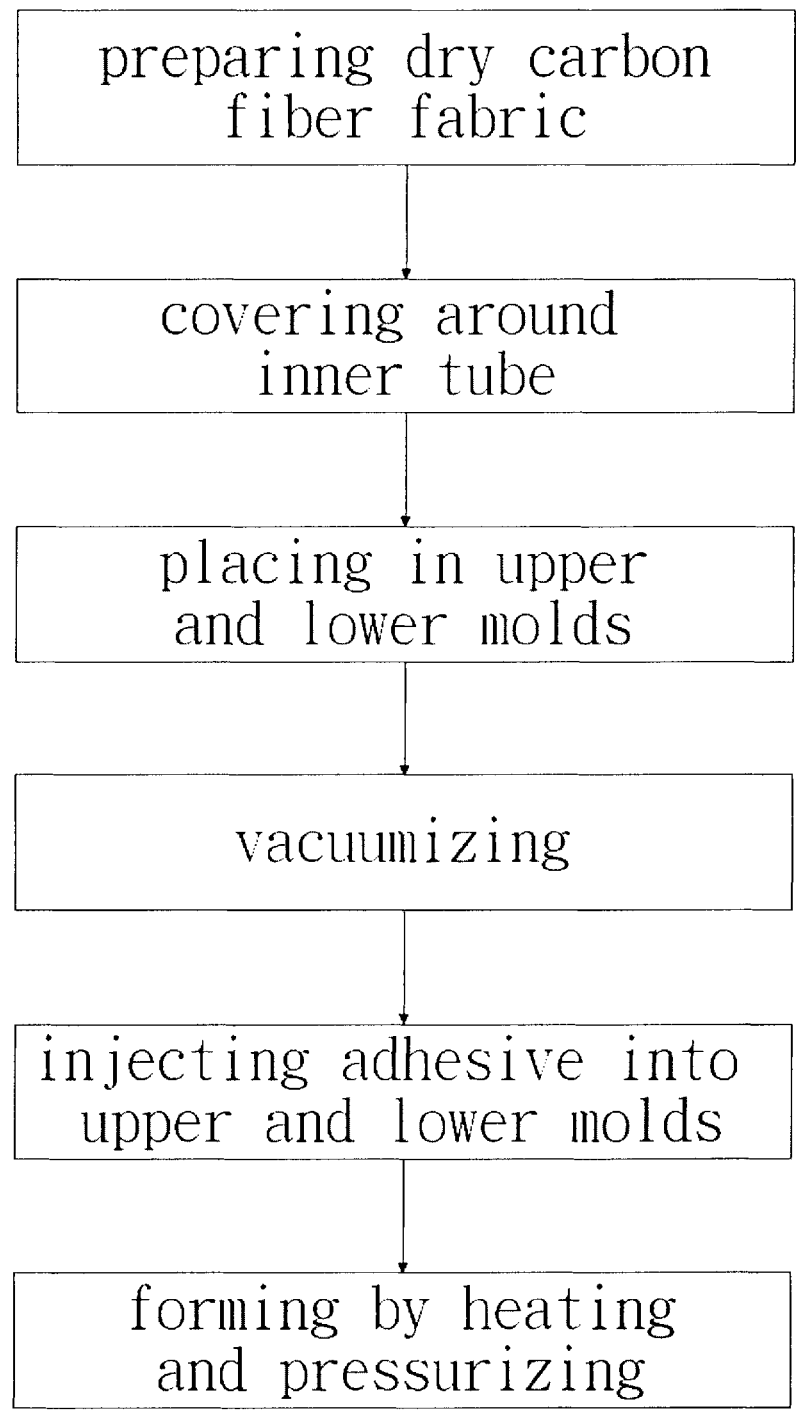
FIG. 1 is a flow diagram of an embodiment of a manufacturing process for a bicycle hub in accordance with the present invention.
Figure 2:
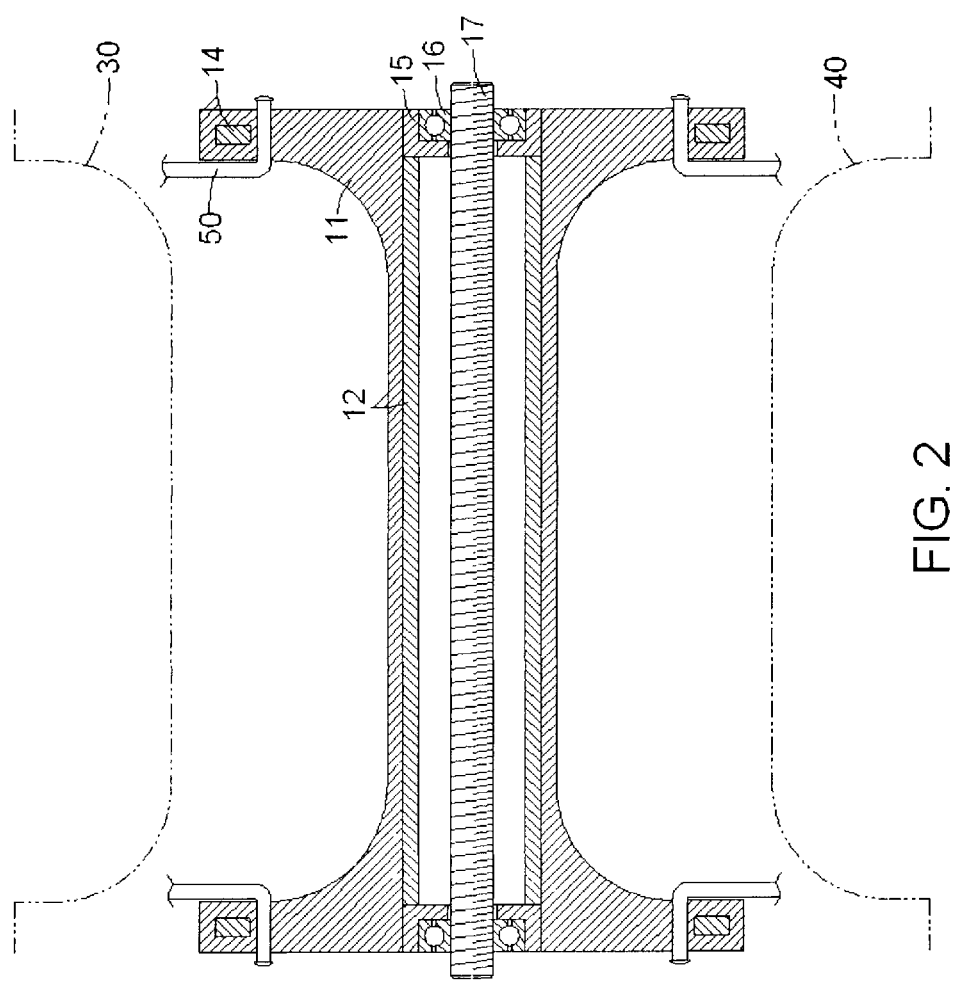
FIG. 2 is a cross-sectional side view of an embodiment of a product in accordance with the present invention.

With reference to FIGS. 1 and 2, an embodiment of a manufacturing process for a bicycle hub in accordance with the present invention comprises steps below:

Preparing dry carbon fiber fabric: at least one layer of tubular dry carbon fiber fabric is pre-woven and each one of the at least one layer of tubular dry carbon fiber fabric is formed by weaving and covering with at least one layer of carbon fiber. The "dry" carbon fiber fabric herein is meant to indicate that the carbon fiber fabric is not pre-impregnated with resin or coated with adhesive. The "tubular" dry carbon fiber fabric herein is meant to indicate that the cross-section of the dry carbon fiber fabric is a closed curve. Thus a carbon fiber layer (11) formed with one tubular dry carbon fiber fabric is seamless. The tubular dry carbon fiber fabric is woven and may be flexible to cover an object with a varied outer diameter.

Covering around an inner tube: the at least one layer of tubular dry carbon fiber fabric is covered around a metal inner tube (12) and at least one of the at least one layer of tubular dry carbon fiber fabric wraps multiple reinforcing elements (14) respectively on two ends. The inner tube (12) may serve as an inner mold when the tubular dry carbon fiber fabric is molding. Preferably, the at least one layer of tubular dry carbon fiber fabric comprises multiple layers and has more layers in the ends than in the middle section of the at least one layer of tubular dry carbon fiber fabric. Hence, after the at least one tubular dry carbon fiber fabric is covered around the inner tube (12), the at least one tubular dry carbon fiber fabric forms two structures respectively on the ends of the inner tube (12) and each structure has a gradually reduced outer diameter from one end to the middle section of the at least one tubular dry carbon fiber fabric. The reinforced elements (14) may be rigid materials such as metal or ceramic to strengthen the structures. After the reinforced elements (14) are wrapped, two flanges may be formed on the ends of the at least one layer of tubular dry carbon fiber fabric. Multiple through hole may be formed respectively on the flange for connecting bicycle spokes (50). Two bearing brackets (15) may be further mounted respectively on the ends of the at least one layer of tubular dry carbon fiber fabric for subsequently installing bearings (16) and a shaft (17). A release treatment may be applied on the outer surface of the inner tube (12) so the inner tube (14) can be drawn off form a side of the at least one layer of tubular dry carbon fiber fabric after the at least one layer of tubular dry carbon fiber fabric is bonded.

Placing in upper and lower molds: the inner tube (12) and the at least one layer of tubular dry carbon fiber fabric covered around the inner tube (12) are placed in upper and lower molds (30) (40) to hold the at least one layer of tubular dry carbon fiber fabric to form a desired shape.

Vacuuming: the inside of the upper and lower molds (30) (40) are vacuumed to further tighten the least one layer of tubular dry carbon fiber fabric and facilitate to inject adhesive.

Injecting adhesive into upper and lower molds: adhesive is injected into the upper and lower molds (30) (40) and the at least one layer of tubular dry carbon fiber fabric is fully permeated by and impregnated with adhesive.

Figure 3:
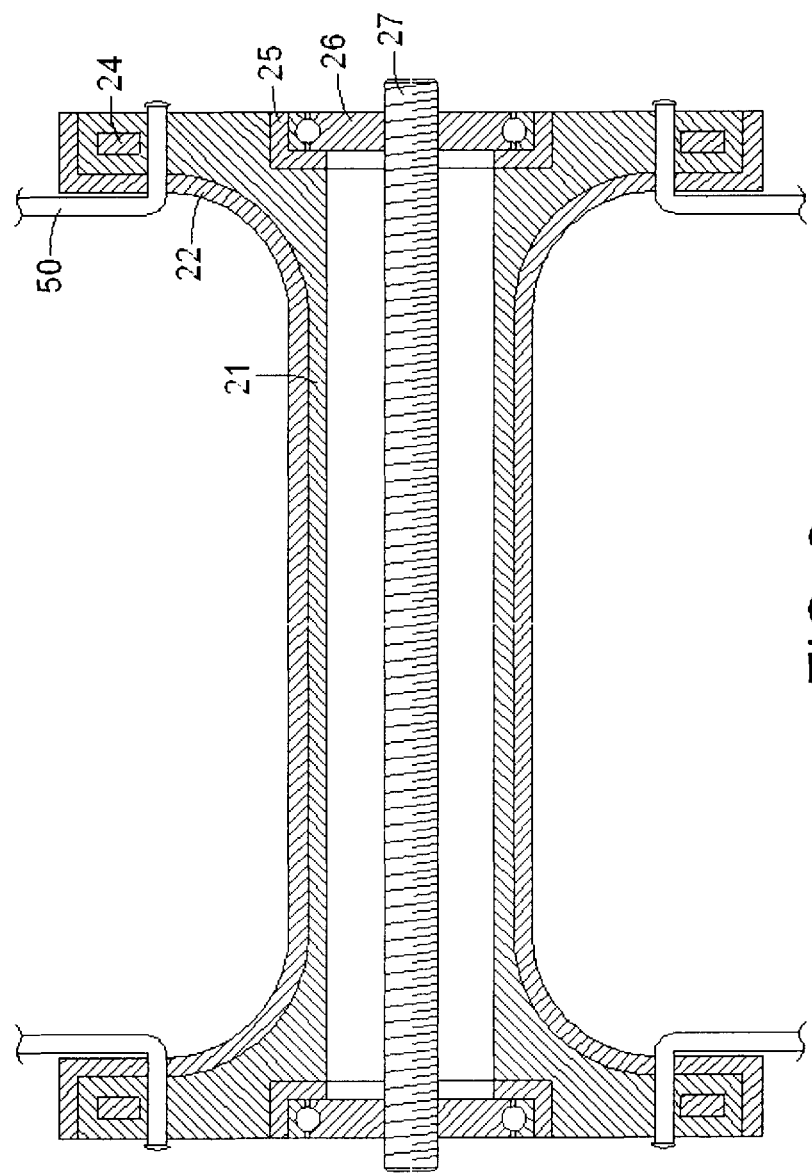
FIG. 3 is a cross-sectional side view of another embodiment of the product in accordance with the present invention.

Forming by heating and pressurizing: the at least one layer of tubular dry carbon fiber fabric impregnated with adhesive is heated and pressurized to form at least one carbon fiber layer (11) with a desired hub shape. With further reference to FIG. 3, the inner tube (12) is released and drawn off optionally from a side of the at least one carbon fiber layer (21) after the at least one carbon fiber layer (21) is formed. The bearings (16) (26) may be installed in the bearing brackets (15) (25) and the shaft (17) (27) may be installed in the bearings (16) (26).

Because the embodiment of the manufacturing process of the present invention use the tubular dry carbon fiber fabric to from the hub and easily construct the desired hub shape with the tubular dry carbon fiber fabric being covered around the inner tube, the complicated procedures of overlaying and rolling up several carbon fiber sheets can be avoided and the production rate and efficiency are enhanced. Additionally, each carbon fiber layer (11) (21) formed is seamless and has less defects such as bubbles and cracks, thus the product stability is improved and extra back-end work is reduced. Hence, the manufacturing cost is decreased.

With reference to FIG. 2, an embodiment of the product formed by the manufacturing process comprises at least one tubular carbon fiber layer (11), an inner tube (12), multiple reinforced elements (14), two bearing brackets (15), two bearings (16), and a shaft (17). Each one of the at least one tubular carbon fiber layer (11) has a pre-woven tubular carbon fiber fabric and a cross-section of a closed curve and is seamless. The at least one tubular carbon fiber layer (11) may comprises multiple layers and has more layers in two ends than in the middle section of the at least one tubular carbon fiber layer (11). Hence, the outer diameter of the at least one tubular carbon fiber layer (11) is gradually reduced from one end to the middle section of the at least one tubular carbon fiber layer (11). The inner tube (12) is mounted through the at least one tubular carbon fiber layer (11). The outer surface of the inner tube (12) is attached to the inner surface of the at least one tubular carbon fiber layer (11). The inner tube (12) is metal and serves as an inner mold when the at least one tubular carbon fiber layer (11) is formed. The reinforced elements (14) are mounted respectively in at least one of the at least one tubular carbon fiber layer (11) on the ends and thus two flanges may be formed on the ends of the at least one tubular carbon fiber layer (11). The bearing brackets (15) are mounted respectively in the ends of the at least one tubular carbon fiber layer (11). The bearings (16) are mounted respectively in the bearing brackets (15). The shaft (17) is mounted through the bearings (16). When the embodiment of the product of the present invent serve as a hub to build bicycle wheels and connect to bicycle spokes (50), one end of each spoke (50) is connected to one of the flanges. The reinforced elements (14) can strengthen the flanges and prevent the spokes (50) from damaging the flanges.

With further reference to FIG. 3, another embodiment of the product of the present invention comprises at least two tubular carbon fiber layers (21) (22), multiple reinforced elements (24), two bearing brackets (25), two bearings (26), and a shaft (27). In this embodiment, the inner tube (12) serving as an inner mold is removed and drawn off from a side of the tubular carbon fiber layers (21) (22) after the tubular carbon fiber layers (21) (22) are formed. Thus, the weight of this product is further reduced. The reinforced elements (24) are wrapped respectively by one of the tubular carbon fiber layers (21) (22) on the ends and the ends are rolling up to wrap the reinforced elements (24). The bearing brackets (25) are embedded respectively into the ends of the tubular carbon fiber layers (21) (22) to facilitate the removing of the inner tube (14).

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A manufacturing process for a bicycle hub comprising
preparing dry carbon fiber fabric: at least one layer of tubular dry carbon fiber fabric being pre-woven and each one of the at least one layer of tubular dry carbon fiber fabric being formed by weaving and covering with at least one layer of carbon fiber;
covering around an inner tube: the at least one layer of tubular dry carbon fiber fabric being covered around a metal inner tube and at least one of the at least one layer of tubular dry carbon fiber fabric wrapping multiple reinforcing elements respectively on two ends;
placing in upper and lower molds: the inner tube and the at least one layer of tubular dry carbon fiber fabric covered around the inner tube being placed in upper and lower molds;
vacuuming: the inside of the upper and lower molds being vacuumed;
injecting adhesive into upper and lower molds: adhesive being injected into the upper and lower molds and the at least one layer of tubular dry carbon fiber fabric being fully permeated by and impregnated with adhesive; and
forming by heating and pressurizing: the at least one layer of tubular dry carbon fiber fabric impregnated with adhesive being heated and pressurized to form at least one carbon fiber layer.

2. The manufacturing process for a bicycle hub as claimed in claim 1, wherein
the inner tube is released and drawn off from a side of at least one layer of tubular dry carbon fiber fabric after at least one layer of tubular dry carbon fiber fabric is formed.

3. The manufacturing process for a bicycle hub as claimed in claim 2, wherein
the at least one layer of tubular dry carbon fiber fabric forms two structures respectively on two ends of the inner tube and each structure has a gradually reduced outer diameter from one end to a middle section of at least one layer of tubular dry carbon fiber fabric after at least one layer of tubular dry carbon fiber fabric is covered around the inner tube.

4. The manufacturing process for a bicycle hub as claimed in claim 3, wherein
the at least one layer of tubular dry carbon fiber fabric comprises multiple layers and has more layers in the ends than in the middle section of the at least one layer of tubular dry carbon fiber fabric.

5. The manufacturing process for a bicycle hub as claimed in claim 1, wherein
the at least one layer of tubular dry carbon fiber fabric forms two structures respectively on two ends of the inner tube and each structure has a gradually reduced outer diameter from one end to a middle section of at least one layer of tubular dry carbon fiber fabric after the at least one layer of tubular dry carbon fiber fabric is covered around the inner tube.

6. The manufacturing process for a bicycle hub as claimed in claim 5, wherein
the at least one layer of tubular dry carbon fiber fabric comprises multiple layers and has more layers in the ends than in the middle section of the at least one layer of tubular dry carbon fiber fabric.

* * * * *